US012227626B2

(12) United States Patent
Shukla et al.

(10) Patent No.: US 12,227,626 B2
(45) Date of Patent: Feb. 18, 2025

(54) FLUORINATED-ALIPHATIC HYDROCARBON BASED STABLE ANION-EXCHANGE MEMBRANE AND ITS METHOD OF PREPARATION THEREOF

(71) Applicants: COUNCIL OF SCIENTIFIC & INDUSTRIAL RESEARCH, New Delhi (IN); ONGC ENERGY CENTRE, New Delhi (IN)

(72) Inventors: Geetanjali Shukla, Gujarat (IN); Mani Bhushan, Gujarat (IN); Sonu Kumar, Gujarat (IN); Arindam Kumar Das, Gujarat (IN); Prerana Sharma, Gujarat (IN); Anuj Kumar Singh, Gujarat (IN); Vinod Kumar Shahi, Gujarat (IN); Bharat Bhargava, New Delhi (IN); Damaraju Parvatalu, New Delhi (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 581 days.

(21) Appl. No.: 17/622,185

(22) PCT Filed: Jun. 25, 2020

(86) PCT No.: PCT/IN2020/050552
§ 371 (c)(1),
(2) Date: Dec. 22, 2021

(87) PCT Pub. No.: WO2020/261295
PCT Pub. Date: Dec. 30, 2020

(65) Prior Publication Data
US 2023/0044103 A1 Feb. 9, 2023

(30) Foreign Application Priority Data
Jun. 25, 2019 (IN) .............................. 201911025144

(51) Int. Cl.
*C08J 5/22* (2006.01)
*B01J 41/09* (2017.01)

(52) U.S. Cl.
CPC ......... *C08J 5/2237* (2013.01); *C08J 2333/26* (2013.01); *C08J 2427/16* (2013.01)

(58) Field of Classification Search
USPC ..................................................... 521/27, 31
See application file for complete search history.

(56) References Cited

U.S. PATENT DOCUMENTS 5,679,482 A 10/1997 Ehrenberg et al.
7,544,278 B2 6/2009 Aminabhavi et al.
(Continued)

FOREIGN PATENT DOCUMENTS

WO WO 2016/124427 A1 * 8/2016 .......... H01M 8/1023

OTHER PUBLICATIONS

Chen, et al., "Preparation and properties of alkaline anion exchange membrane with semi-interpenetrating polymer networks based on poly(vinylidene fluoride-co-hexafluoropropylene)", J. Appl. Polym. Sci. 135.5 (2018): 45775. (Year: 2018).*
(Continued)

*Primary Examiner* — Fred M Teskin
(74) *Attorney, Agent, or Firm* — Blank Rome LLP (57) ABSTRACT

Anion-exchange membranes are useful for electro-membrane processes such as electrodialysis (water desalination, separation of inorganics from organic molecules, separation of specific inorganic ion, etc.), in-situ ion-exchange and ion substitution, electro-deionization for producing ultrapure water, polymer electrolyte membrane for alkaline fuel cell and electrolysis applications. The present invention discloses an acid and base resistant fluorinated hydrocarbon based anion-exchange membrane and its method of preparation thereof. In the first step co-polymerization is carried
(Continued)

out between N-isopropylacrylamide and 1-vinylimidazole. In the second step, obtained inter-polymer of isopropylacrylamide-co-vinylimidazole co-polymer is mixed with poly (vinylidene fluoride-co-hexafluoropropylene) (PVDF-co-HFP) (IA-co-VI/PVDF-co-HFP), which is used for casting membrane film of desired thickness. The obtained casted membrane thin film is quaternized in methyl iodide solution.

17 Claims, 3 Drawing Sheets

(56) References Cited

U.S. PATENT DOCUMENTS

| | | | |
|---|---|---|---|
| 7,649,025 | B2 | 1/2010 | Kitamura et al. |
| 9,233,345 | B2 | 1/2016 | He et al. |
| 9,263,757 | B2 | 2/2016 | Yan et al. |
| 9,350,036 | B2 | 5/2016 | Pintauro et al. |
| 9,476,132 | B2 | 10/2016 | Kettner et al. |
| 9,620,802 | B2 | 4/2017 | Nakano et al. |
| 9,692,072 | B2 | 6/2017 | Suzuki et al. |
| 9,700,850 | B2 | 7/2017 | Zhang et al. |
| 9,745,432 | B2 | 8/2017 | Chatterjee et al. |
| 2004/0242708 | A1 | 2/2004 | Masuda et al. |

OTHER PUBLICATIONS

Shahi, Vinod K., et al., Preparation and electrochemical characterization of sulfonated interpolymer of polyethylene and styrene—divinylbenzene copolymer membranes, Reactive & Functional Polymers 46 (2000) 39-47, 2000 Elsevier Science B.V., www.elsevier.com/locate/react, India.

Sata, Toshikatsu et al., Transport Properties of Anion Exchange Membranes prepared by the Reaction of Crosslinked Membranes Having Chloramethyl Groups with 4-Vinylpyridine and Trimethylamine, Journal of Polymer Science: Part B: Polymer Physics, vol. 37, 1773-1785 (1999), © 1999 John Wiley & sons, Inc., CCC 0887-6266/99/151773-13, Japan.

Li, Yuan, et al., Fundamental studies of a new series of anion exchange membranes: Membranes, prepared from bromomethylated poly(2,6-dimethyl-1,4-phenylene oxide) (BPPO) and pyridine, Journal of Membrane Science 279 (2006) 200-208, www.elsevier.com/locate/memsci, © 2005 Elsevier B.V., doi:10.1016/j.memsci.2005.12.006, China.

Sata, T, et al., Anion exchange membranes prepared by amination of cross-linked membranes having cholormethyl groups with 4-vinylpyridine and trimethylamine, Polymer 40 (1999) 7423-7249, © 1999 Elsevier Science Ltd., PII: S0032-3861(99)00050-6, Japan.

Kumar, Mahendra, et al., Cross-Linked Poly(vinyl alcohol)-Polky(acrylonitrile-co2-dimethylamino ethylmethacrylate) Based Anion-Exchange Membranes in Aqueous Media, J. Phys. Chem B. 2010, 114, 198-206, 10.1021/jp9082079, © 2010 American Chemical Society, Published on Web Nov. 25, 2009, India.

Readi, O.M. Kattan et al., On the Isolation of Single Basic Amino Acids with Electrodialysis for the Production of Biobased Chemicals, I&EC Research, Industrial & Engineering Chemistry Research, ACS Publications, © 2012 American Chemical Society, dx.doi.org/10.1021/ie202634v/Ind.Eng.Chem.Res. 2013, 52, 1069-1078, The Netherlands.

Zhang, Haoqin, et al. Composite Anion Exchange Membrane from Quaternized Polymer Spheres with Tunable and Enhanced Hydroxide Conduction Property, ACS Publications, © 2016 American Chemical Society, DOI: 10.1021/acs.iecr.6b01741, Ind. Eng. Chem. Res. 2016, 55, 9064-9076, China.

Sharma, Prem, et al., PVDF-g-poly (styrene-co-vinylbenzyl chloride) based anion exchange membrane: High salt removal efficiency and stability, Desalination 444 (2018) 35-43, journal homepage: www.elsevier.com/locate.desal, https://doi.org/10.1016/j.desal.2018.07.002, 001-9164/© 2018 Elsevier B.V., Gujarat, India.

Wang, Qun et al., Hybrid RED/ED system: Simultaneous osmotic energy recovery and desalination of high-salinity wastewater, Desalination 405 (2017) 59-67, http://dx.doi.org/10.1016/j.desal.2016.12.005, 0011-9164/© 2016 Elsevier B.V., China.

* cited by examiner

FIG. 1 Anion exchange membrane

FLUORINATED-ALIPHATIC HYDROCARBON BASED STABLE ANION-EXCHANGE MEMBRANE AND ITS METHOD OF PREPARATION THEREOF

CROSS REFERENCE TO RELATED APPLICATIONS

This application is a national phase of PCT application No. PCT/IN2020/050552, filed Jun. 25, 2020, which claims priority to IN patent application No. 201911025144, filed Jun. 25, 2019 which is incorporated herein by reference thereto.

FIELD OF THE INVENTION

The present invention relates to acid and base resistant fluorinated hydrocarbon based anion exchange membrane. Particularly, present invention relates to a process for the preparation of the acid and base resistant fluorinated hydrocarbon based anion-exchange membrane. More particularly, present invention relates to the anion-exchange membrane showed good stabilities and performance in various applications viz., electrodialysis, fuel cell and other electrochemical processes in which it is used as a membrane as separator.

BACKGROUND OF THE INVENTION

The anion-exchange membranes contain fixed positive charged basic functional groups such as —$NR_3+$, —$PR_3+$, —$SR_2+$ etc. directly attached to the polymeric backbone. Anion-exchange membranes are essential components for diversified electro-membrane processes such as electrodialysis (water desalination, separation of inorganics from organic molecules, separation of specific inorganic ion, etc.) for in-situ ion-exchange and ion substitution, electro-deionization for producing ultrapure water, polymer electrolyte membrane for alkaline fuel cell and electrolysis applications.

To evaluate the suitability of anion-exchange membrane for various electrochemical applications stability (thermal, mechanical and chemical) is considered the primary parameter. Generally the physico-chemical and electrochemical property of ion-exchange membranes depend on the well-arranged ratio of hydrophilic and hydrophobic domains present in the membrane matrix. Further the ion-exchange membranes need to have the following properties for various practical applications.

High permselectivity—an ion-exchange membrane should be highly permeable to counter-ions, but should be impermeable to co-ions.

Low electrical resistance—the permeability of an ion-exchange membrane for the counter-ions under the driving force of an electrical potential gradient should be as high as possible.

Good mechanical and form stability—the membrane should be mechanically strong and should have a low degree of swelling or shrinking in transition from dilute to concentrated ionic solutions.

High chemical stability—the prepared membrane should be stable in Fenton's reagent which suggest about its stability in harsh oxidative condition. Further prepared anion-exchange membrane showed good stability in harsh alkaline (NaOH/KOH) environment.

In the electrodialysis process anion-exchange membranes used for the separation of anions, without any mass transfer (dense nature), which enhances the process efficiency besides delivering better quality product.

During electrolysis the anion-exchange membranes are placed between the electrodes (anode and cathode) and thus the membrane has to face the environment of electrode chambers especially anode chamber is oxidative in nature due to formation of free radicals.

Reference may be made to an article Reactive & Functional Polymers, 46: 39-47 (2000), wherein commercial anion-exchange membranes are prepared by copolymerisation of styrene-divinyl benzene, and anion-exchange group introduced into the polymer by chloromethylation followed by amination with triamine. The styrene-divinyl benzene copolymer is not easily moldable with sufficient mechanical strength, thus polysulfones, poly ether sulfones, polyethylene etc. were used as binder matrix. Further, use of toxic chemicals such as chloromethyl ethers (a carcinogenic chemical), limits the reported methodology.

Reference may be made to an article Journal of membrane Science, 37: 1773-1785 (1999); 493: 373-381 (2015) wherein successful anion-exchange membranes have been prepared by copolymerization of chloromethylstyrene or vinyl pyridine-divinyl benzene using benzoyl peroxide as an initiator.

Reference may be made to an article Journal of membrane Science, 279: 192-199, (2006) wherein new a series of anion-exchange membrane were also reported by bromination followed by amination of poly(2,6-dimethyl-1,4-phenylene oxide) (PPO).

Reference may be made to an article Polymer, 40: 7243-7249 (1999) wherein another attempts were also made to synthesize anion-exchange membrane by copolymerizing 4-vinylpyridine with divinyl benzene.

Reference may be made to an article U.S. Pat. No. 5,936,004, disclosed blended membrane of epichlorohydrin and polyacrylonitrile in the presence of 1,4-diazobicycle-(2,2,2)-octane.

Reference may be made to an article J. Phy. Chem. B: 114, 198-206 (2010) wherein cross-linked poly(vinyl alcohol)-poly(acrylonitrile-co-2-dimethylamino ethyl methacrylate) based anion-exchange membrane also show good performance in the electrodialysis.

Reference may be made to an article Ind. Eng. Chem. Res.: 55, 7171-7178, (2016) wherein effort was also made to prepare a polyvinylidene fluoride (PVDF), polyepichlorohydrin (PECH) and 1,4 diazabicyclo[2.2.2] octane, based composite anion-exchange membranes with improved characteristic of membranes such as ion-exchange capacity (IEC), water uptake (WR), thermal stability, mechanical property, and area resistance were investigated to evaluate their applicability in electrodialysis.

Reference may be made to an article Ind. Eng. Chem. Res.: 55, 9064-9076, (2016) wherein anion-exchange membrane with improved conductivity was also prepared by using chitosan, quaternized polymer sphere with quaternary ammonium group.

Reference may be made to an article Desalination: 444, 35-43, (2018) wherein anion-exchange membrane based on PVDF-g-poly (styrene-co-vinylbenzyl chloride) was also reported that showed good performance in electrodialysis.

Reference may be made to an article Desalination: 362, 59-67, (2015) wherein polyaniline (PANI)/polyvinylidene fluoride (PVDF) based anion-exchange membrane was also reported.

However, these anion-exchange membranes were unstable in strong acidic/alkaline solutions, and a pre-treatment process must be required to remove unwanted ions prior to electrodialysis. Therefore, an easy synthetic procedure for the preparation of anion-exchange membrane with excellent chemical, mechanical, and thermal stability, and without any use of hazardous chemicals is urgently required.

Reference may be made to U.S. Pat. No. 9,692,072B2 wherein an anion-exchange membrane containing quaternary ammonium group resistant to alkali attack is reported for alkaline fuel cell application.

Reference may be made to U.S. Pat. No. 9,620,802B2 wherein fuel cell membrane electrode assembly including an anion-exchange membrane and a catalyst layer disposed on the surface of the membrane has been discussed.

Reference may be made to U.S. Pat. No. 9,263,757B2 wherein family of membrane forming polymers with good hydroxide ion conductivity and mechanical stability such as polysulfone functionalized with three types of quaternary phosphonium functional group was reported.

Reference may be made to U.S. Pat. No. 7,649,025B2, disclosed heterogeneous composite anion-exchange membrane with high swelling resistance and superior mechanical comprising of anion-exchange resin coated on porous support film and aromatic polyether and its derivatives as binder.

Reference may be made to U.S. Pat. No. 5,679,482A wherein fuel cell ion-exchange membrane was prepared by ion conducting group covalently bonded to the polymeric backbone that help in the transfer of majority of ion conducting channel from anode to cathode or vice versa depends on the charged nature of ion-exchange membrane.

Reference may be made to U.S. Pat. No. 9,476,132B2 wherein a two-compartment electrochemical cell separated by ion-exchange membrane was disclosed for hydrogen production by CuCl/HCl electrolysis process.

Reference may be made to U.S. Pat. No. 9,745,432B2 wherein the anion-exchange membrane was disclosed for water desalination by electrodialysis. The anion-exchange membrane was prepared by using the polyacrylonitrile (PAN), poly(2-dimethylamino)ethyl methacrylate (PDMA), poly n-butylacrylate (PnBA) and methyl iodide. The prepared membrane exhibited good properties and assessed suitable for the water desalination.

Reference may be made to U.S. Pat. No. 9,700,850B2 wherein ion-exchange membrane comprising ion-exchange polymer and inorganic particles (graphene or graphitic oxide) linked between the polymer was reported for electrochemical application.

Reference may be made to U.S. Pat. No. 9,233,345B2 disclosed anion-exchange membrane for fuel cells, water electrolyzers or water filtration system. The structural morphology of anion-exchange membrane was based on a hydrophobic polysulfone backbone and co-grafted poly(ethylene glycol) and anion conducting quaternary ammonium groups.

Reference may be made to U.S. Pat. No. 9,350,036B2 wherein to architect composite anion-exchange membrane for diversified applications, spinning technique was used with mixture of polymer solutions (Nafion as charged polymer and polyether sulfone as uncharged polymer).

Reference may be made to US20040242708A1 wherein fluoro-polymer based ion-exchange membrane was prepared by fluorocarbon resin by melt processing to achieve good mechanical stability and storage modulus.

Reference may be made to U.S. Pat. No. 7,544,278B2 wherein heterogeneous type of anion-exchange membrane was prepared by in situ polymerization of monomer, polymer or co-polymer on a woven support (preferably PVC) for water desalination by electrodialysis.

OBJECTS OF THE INVENTION

The main object of the present invention is to provide acid and base resistant fluorinated hydrocarbon based anion-exchange membrane.

Another object of the present invention is to provide a process for the preparation of the acid and base resistant fluorinated hydrocarbon based anion-exchange membrane.

Yet another object of the present invention is to provide anion-exchange membrane showed good stabilities and performance in various applications viz., electrodialysis, fuel cell and other electrochemical processes in which it is used as a membrane as separator.

SUMMARY OF THE INVENTION

Accordingly, present invention provides a homogeneous anion-exchange membrane having repeating unit of formula 1, Formula 1

In an embodiment of the present invention, the membrane has an ion-exchange capacity is in the range of 1.00 to 1.70 meq/g.

In another embodiment of the present invention, the membrane has conductivity in the range of $3.0-6.0 \times 10^{-2}$ S cm$^{-1}$.

In yet another embodiment of the present invention, the membrane exhibits swelling ratio in the range of 5-10% under the treatment of hot water at temperature in the range of 60-65° C. for a time period of 24-36 hours.

In yet another embodiment of the present invention, a membrane weight, an ion-exchange capacity and a conductivity loss is less than 4% under alkaline environment) or harassed oxidative environment.

In yet another embodiment of the present invention, the alkaline environment is achieved by 2.0 M NaOH at temperature in the range of 60-65° C. for time period in the range of 120-150 hours; and the harassed oxidative environment is achieved by 3 ppm+3% $H_2O_2$ at temperature of 70° C. for 1-3 hours In yet another embodiment, the present invention provides a process for the preparation of anion-exchange membrane, comprising the steps of:
  i. adding 1-vinyl imidazole and N-isopropyl acrylamide to a dimethyl acetamide in a vessel under constant stiffing and nitrogen environment at a temperature in the range of 25 to 30° C. to obtain a solution;
  ii. charging the solution as obtained in step (i) with radical initiator azobisisobutyronitrile (AIBN) at temperature in the range of 90-95° C. for time period in the range of 24 hours with stirring to obtain isopropylacrylamide-co-vinylimidazole (IA-co-VI) copolymer solution;
  iii. mixing poly(vinylidene fluoride-co-hexafluoropropylene) [PVDF-co-HFP] and dimethyl acetamide (DMAc) in a ratio ranging between 1:5 (w/v) for time period in the range of 14 hours to obtain a solution;
  iv. mixing both the solutions as obtained in step (ii) and (iii) with stirring at temperature in the range of 75-95° C. for a period in the range of 12 hours to get a membrane forming polymer solution;
  v. casting of thin film membrane with the solution as obtained in step (iv) followed by drying at temperature in the range of 60-80° C. for period in the range of 24-30 hours under vacuum oven to obtain a membrane;
  vi. quaternizing the membrane as obtained in step (v) by dipping in 10 wt % of methyl iodide solution for time period in the range of 24-30 hours at a temperature in the range of 30-40° C. to introduce a quaternary ammonium group in a membrane matrix;
  vii. washing the membrane matrix as obtained in step (vi) followed by converting into hydroxide form by immersing in a sodium hydroxide solution to obtain the anion exchange membrane.

In yet another embodiment of the present invention, the weight ratios of N-isopropylacrylamide and 1-vinylimidazole is in the range of 2:0.5 to 2:1.5.

In yet another embodiment of the present invention, the dimethyl acetamide is mixed with the isopropylacrylamide-co-vinylimidazole copolymer in the ratio of 1:10 (w/v).

In yet another embodiment of the present invention, the ratio of isopropylacrylamide-co-vinylimidazole (IA-co-VI) copolymer and PVDF-co-HFP copolymer ranges from 1.0-1.5:0.5-0.7 (w/w).

In yet another embodiment of the present invention, wherein the anion-exchange membrane has 1.26 meq/g anion-exchange capacity.

In yet another embodiment of the present invention, wherein the anion-exchange membrane showed 3.66×10$^{-2}$ S cm$^{-1}$ hydroxide ion conductivity.

In yet another embodiment of the present invention, wherein the anion-exchange membrane showed about 8 to 10% swelling ratio (under treatment of hot water at 60° C. for 24 hours).

In yet another embodiment of the present invention, wherein the anion-exchange membrane exhibited good oxidative stability with about 5% loss in weight, ion-exchange capacity and conductivity after treatment under harassed oxidative environment (3 ppm $FeSO_4$+3% $H_2O_2$ at 70° C. for 3 h).

In yet another embodiment of the present invention, wherein the anion-exchange membrane showed good alkaline stability (in 2.0 M NaOH at 60° C. for 5 days) due to absence of β-hydrogen, and reduced nucleophilic substitution reaction because of steric hindrance.

In yet another embodiment of the present invention, wherein functional charged density of the anion-exchange membrane can be controlled by weight ratio of copolymer solution in the membrane forming material.

In yet another embodiment of the present invention, the interpolymerisation of isopropylacrylamide-co-vinylimidazole copolymer and poly(vinylidene fluoride-co-hexafluoropropylene) (PVDF-co-HFP), formed homogeneous dense membrane without any phase separation because of H-bonding.

In yet another embodiment of the present invention, wherein vinylimidazole-co-isopropylacrylamide copolymer was prepared in the presence of initiator (AIBN) by free radical polymerization.

In yet another embodiment of the present invention, wherein isopropylacrylamide-co-vinylimidazole copolymer provides active site for the successful attachment of quaternary amine groups.

In yet another embodiment of the present invention, wherein any anion-exchange functional group (phosphonium and sulfonium, etc.) may be grafted with isopropylacrylamide-co-vinylimidazole copolymer to achieve good conductivity.

In yet another embodiment of the present invention, wherein chemical structure of isopropylacrylamide-co-vinylimidazole copolymer is similar to formula 2.

Formula 2

In yet another embodiment of the present invention, wherein polymer (PVDF-co-HFP) with chemical structure similar to formula 3, provides highly stable fluorinated polymer back bone and thus stability to the anion-exchange membrane.

Formula 3

In yet another embodiment of the present invention, wherein anion-exchange membrane with high functional charge density exhibited reduced cell voltage and improved current efficiency during electrodialysis because of grafted functional (quaternary ammonium or phosphonium) groups with fluorinated polymer.

In yet another embodiment of the present invention, wherein anion-exchange membrane with high functional charge density exhibited improved current efficiency followed by power density during fuel cell application because of grafted functional (quaternary ammonium or phosphonium) groups with fluorinated polymer.

In yet another embodiment of the present invention, wherein anion-exchange membrane according to the present invention showed high efficiency during Cu—Cl cycle for hydrogen production by electrolysis.

In yet another embodiment of the present invention, the anion-exchange membrane exhibit high efficiency during electrodialysis, fuel cell or Cu—Cl cycle and other electro-membrane applications, followed by superior stabilities (thermal and acid). Thus, the industrial significance of the anion-exchange membrane of the present invention is extremely high.

In yet another embodiment of the present invention, wherein anion-exchange membrane with high functional charge density exhibited improved alkaline stability which is desirable condition for fuel cell application.

DETAILED DESCRIPTION OF THE INVENTION

The present invention disclosed fluorinated-aliphatic hydrocarbon based alkaline resistant anion-exchange membrane, its method of preparation and its subsequent application in various electrochemical processes.

The present invention relates to the development of polymeric anion-exchange membranes for electrodialysis to separate the inorganic salt content from water, alkaline fuel cell for energy devices and membrane electrolysis or other electrochemical applications. The anion-exchange membrane of this invention showed good thermal and chemical stabilities (oxidative and alkaline), excellent hydroxide conductivity, perm-selectivity, current efficiency, current density, power density and other physicochemical properties such as water uptake and ion-exchange capacity which are necessary condition for high performance of prepared anion-exchange membrane during diversified electro-membrane applications in different media. The methods used to produce reported anion-exchange membrane is pretty easy and less expensive in compare to the commercialized anion-exchange membrane. This less expensive part of anion-exchange membrane contribute to the overall economy of the process using these ion-exchange membranes. The invention also contains the use of the reported membrane for variety of electro-membrane applications.

In present invention, the synthetic method opted for the preparation of anion-exchange membrane includes the following steps:
i. preparation of isopropylacrylamide-co-vinylimidazole copolymer via free radical polymerization in DMAc solvent and presence of AIBN initiator;
ii. solution preparation of PVDF-co-HFP (known weight %);
iii. Preparation of interpolymer of isopropylacrylamide-co-vinylimidazolecopolymer and PVDF-co-HFP in DMAc under constant stirring to effect the hydrogen bonding;
iv. membrane thin casting, drying and quternization with methyl iodide solution.

Further the degree of quaternization i.e. the quotient of the total number of quaternary ammonium group present in membrane matrix can be controlled by adjusting the molar ratio of 1-vinylimidazole and volume of methyl iodide. This adjustment regarding degree of functionalization/quaternization will help in adjusting the lowered water uptake or swelling ratio followed by balanced conductivity which is necessary or highly preferable condition for any electrochemical applications. Moreover the reported strategy will help in homogenous formation of membrane due to strong hydrogen bonding interaction between copolymer and polymeric chain. Further the present invention is a green method to prepare the anion-exchange membrane wherein we tried to avoid the use of hazardous material in comparison to other anion-exchange membrane preparative routes. Further the manufacture of present invention anion-exchange membrane is very inexpensive which make it an ideal candidate for numerous applications in varieties of fields.

In present invention, highly basic, oxidative or alkaline stable anion-exchange membrane was prepared using isopropylacrylamide-co-vinylimidazole copolymer and PVDF-co-HFP solution in DMAc. Prepared membrane thin film was quaternized using methyl iodide, to prepare the anion-exchange membrane, according to the FIG. 1.
i. Known amount of 1-vinyl imidazole, and N-isopropyl acrylamide, were added to known volume of dimethyl acetamide, in a vessel under constant stirring in nitrogen enviroment at 30° C.;
ii. solution obtained in step (i) was charged with radical initiator azobisisobutyronitrile (AIBN) at 90° C. and stirred vigorously for 24 h;
iii. solution preparation of poly(vinylidene fluoride-co-hexafluoropropylene) in dimethyl acetamide (known weight %);
iv. mixing of both solution obtained in step (ii) and (iii) under continuous stirred conditions 90-95° C. for 24 h, to get the membrane forming solution;
v. casting of thin film membrane and drying at 60-80° C. for 24 h under vacuum oven;
vi. quaternization of membrane by dipping in 10 wt % of methyl iodide solution for 24 h to introduce the quaternary ammonium group in membrane matrix.
vii. washing of membrane and conversion to hydroxide form by immersing in 0.1 M sodium hydroxide solution.

Figure 1:
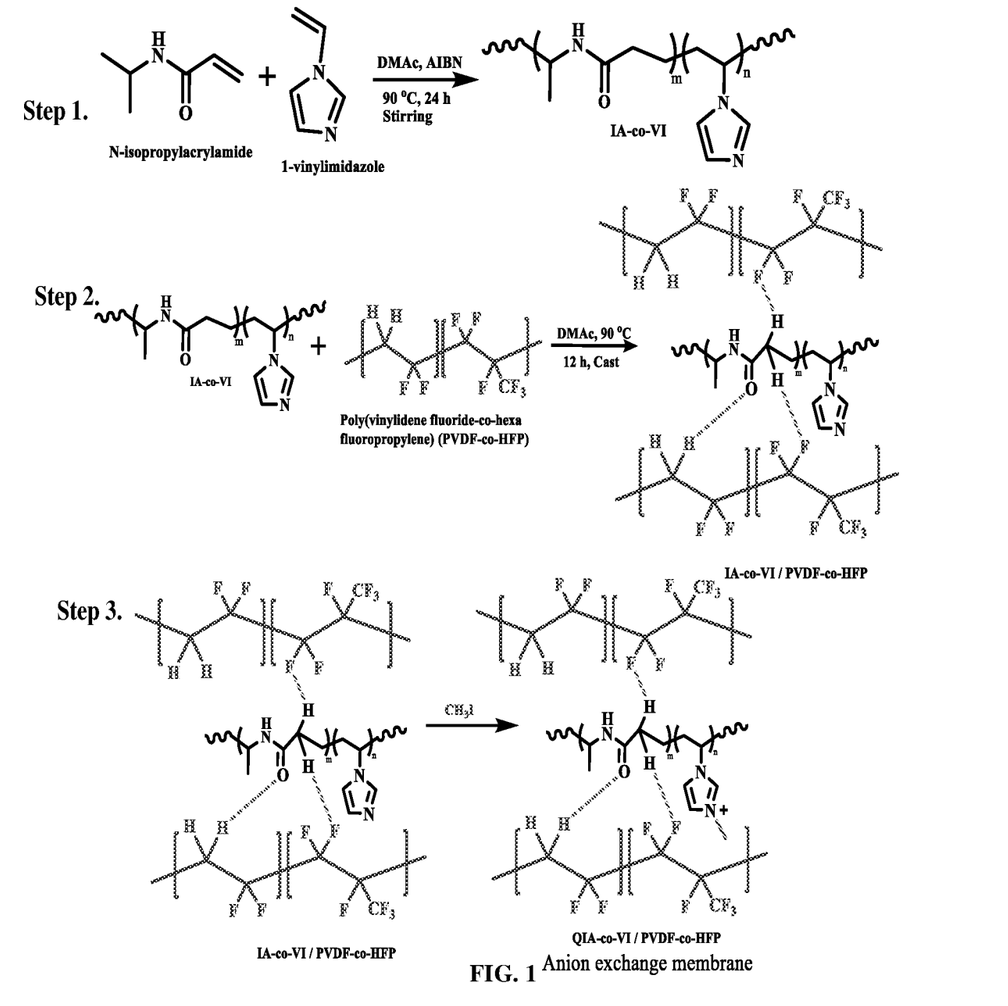
FIG. 1 is an illustration of reaction scheme for the preparation of stable anion-exchange membrane.

In the preparation of anion-exchange membrane, the weight ration of isopropylacrylamide-co-vinylimidazole copolymer and PVDF-co-HFP, was 5:3, while polymeric solution weight percentage was 20%, w/v in DMAc, to achieve homogeneous membrane. Resultant polymer solution was transformed into thin film of desired thickness and dried under vacuum at 60-80° C. for 24 hours to achieve the membrane. Obtained membrane was dipped in methyl iodide (10 wt % in methanol) for 24 hours, to quaternize the vinyl imidazole moiety. Such a reaction scheme for the preparation of anion-exchange membrane is illustrated in FIG. 1.

In the present invention, the process for the preparation of stable anion-exchange membrane represents a novel and simple method with several advantages over the previously reported method of lower cost, without any use of hazardous chemicals. Further, in the reported strategy, functional group (quaternary ammonium group) density can be controlled by controlling isopropylacrylamide-co-vinylimidazole copolymer content in PVDF-co-HFP matrix.

In the present invention, polymer thin film anion-exchange membrane without any fabric (woven) support has been reported. The membrane forming polymer solution possessed the thin film forming capacity and resultant membrane showed high mechanical stability and burst strength. Further, reported anion-exchange membrane can be prepared with non-woven support. Additionally, unlike radiation grafting techniques, the present composite anion-exchange membrane was prepared using interpolymer PVDF-co-HFP and isopropylacrylamide-co-vinylimidazole copolymer, in the presence of free radical initiator. Thus, membrane production technique does not involve and high-energy radiation source.

Numerous electro-membrane processes for water desalination, electro-separation, membrane electrolysis, alkaline fuel cell, and storage battery etc. were developed using anion-exchange membrane. In these applications, cost-effective nature, high permeselectivity, high conductivity and stable nature even in strong alkaline or oxidative environment of anion-exchange membranes are urgently required. Further, prepared anion-exchange membrane may be widely used for membrane electrolysis, fuel cell and battery applications in different medium. Different electrochemical processes such as desired synthesis, electro-deionization, electrodialysis for the removal of inorganic electrolyte, desalination of sea and brackish water, separation and removal of metal ions from the industrial effluent, de-acidification of fruit juice, dashing and sugar cane juice even at high temperature (70-80° C.) for better quality of sugar, purifications and amino acids, vitamins, vaccines and other biochemical purification and down-stream processing of fermentation broth, etc. can be achieved by stable anion-exchange membranes.

Optimum water content in the membrane phase governs hydration of quaternary ammonium functional groups and provide the necessary water molecules for the formation of hydrophilic ion conducting channels, which is responsible for the improved hydroxide conductivity. Further, high water content in the membrane phase causes membrane dimensional instability. Thus, to achieve the stable anion-exchange membrane, an optimized water content (20-30%, w/w) is essential. In the present invention, the proper care to balance the hydrophobic and hydrophilic segments in the membrane forming material has taken, which will enables the desired water content in the membrane matrix.

The ion-exchange capacity (IEC) represents a measure of the hydrophilic character or concentration density of fixed quaternary ammonium groups, and can be measured by meq./g or dry membrane. Density of exchangeable groups in the membrane matrix is also an important factor that controls membrane performance. However, membrane durability depends upon the environmental conditions and polymer backbone nature. All these factors were judicially considered during membrane synthesis. One skilled in the art based upon prior knowledge and description provided above should easily determine the membrane preparation procedure and parameters with specifically desired anion-exchange membrane.

The membrane perm-selectivity is a measure of the characteristic difference in the membrane permeability for counter-ions and co-ions. Counter ion transport number across the membrane was estimated by membrane potential measurement for the estimation of membrane perm-selectivity.

Membrane conductivity of anion-exchange membrane was determined in equilibration with 0.10 M NaCl solution using a potentiostat/galvanostat impedance analyzer. The membrane resistance was determined from Nyquist plots by Fit and Simulation method and considering membrane thickness and area membrane conductivity was estimated.

For these wide applications, the most desired properties required for successful development of anion-exchange membranes are: high permselectivity (close to unity)-anion-exchange membrane should be highly permeable for anion with selective impermeability to cation; high membrane conductivity-anion-exchange membrane should have high membrane conductivity responsible for low potential drop during electrodialysis or electro-membrane processes; good mechanical stability of the membrane should be mechanically strong and should have a low degree of swelling or shrinking in transition from dilute to concentrated ionic solutions; high chemical stability of the membrane should be stable in strong acidic or alkaline environment even in presence of oxidizing agents. Many previous membranes have either exhibited poor stabilities (thermal, chemical and mechanical) or have obtained it at expense of electrochemical properties. For, example cross-linking of the membrane film improves thermal and mechanical properties, but associated with deterioration in functional groups (acidic or basic) concentration thus electrochemical properties. Mechanical strength can be further increased by supporting the membrane by woven fabric (PVC, PE, glass or Teflon). But woven fabric contributes towards the non-conduction phase of the membrane matrix and reduces membrane physicochemical and electrochemical properties.

EXAMPLES

Following examples are given by way of illustration and therefore should not be construed to limit the scope of the invention.

Examples 1-3

General Procedure for the Preparation of Fluorinated-Aliphatic Hydrocarbon Based Stable Anion-Exchange Membrane The N-isopropylacrylamide (12.5 gm) and 1-vinylimidazole (6.7 gm) (2.0:1.0 weight ratio) were added to dimethylacetamide (100 ml) under stirred conditions in nitrogen environment at 30° C., afterward 2,2'-azobis(2-methylpropionitrile) (AIBN) (2 ml) was added and reaction mixture was stirred for 24 h at 90-95° C. for the preparation of isopropylacrylamide-co-vinylimidazole (IA-co-VI) copolymer. In a separate conical flask, PVDF-co-HFP (12.5 gm) was dissolved in dimethylacetamide (60 ml) of under constant stirring for 14 h or till complete dissolution. The clear solution of isopropylacrylamide-co-vinylimidazole copolymer was mixed with PVDF-co-HFP solution, and reaction mixture was stirred for 12 h at 90-95° C. To prepare different anion-exchange membranes, weight ratios of N-isopropylacrylamide and 1-vinylimidazole was varied between 2.0: 0.5-1.5, and resultant three anion-exchange membranes with 2.0:0.5; 2.0:1.0, and 2.0:1.5, were prepared. Obtained viscous solution was poured onto a clean glass plate, and a thin polymer of constant thickness (150 μm) was formed using a doctor-blade. Membrane thin film was dried at 60-80° C. in a vacuum oven.

Obtained membrane was washed with deionized water and dipped in methyl iodide solution (10 wt % in methanol) for 24 hours at 30° C. Resultant membrane was post-treated with NaOH (0.10 M) and subsequently in deionized water. The properties of three different anion-exchange membranes are included in Table 1.

TABLE 1

Composition and properties of acid and oxidative resistant anion-exchange membrane

| Example | Weight ratio of IA-co-VI copolymer: PVDF-co-HFP (w/w)* | Water uptake (%) | Ion-exchange capacity (meq/g) | Membrane conductivity ($\times 10^{-2}$ S cm$^{-1}$) | Swelling ratio (%) |
|---|---|---|---|---|---|
| 1 | 2.0:0.5 | 11.2 | 1.02 | 3.01 | 6.2 |
| 2 | 2.0:1.0 | 13.7 | 1.13 | 3.42 | 7.5 |
| 3 | 2.0:1.5 | 15.0 | 1.35 | 3.90 | 8.4 |

*Mechanical stability of all membranes was excellent.

Examples 4-6

General Procedure for Oxidative Stability of Anion-Exchange Membrane

Under strong oxidative water splitting environment, membrane degradation by oxy active radicals is a serious issue. Thus, oxidative stability of anion-exchange membranes was assessed under simulated oxidative conditions (3 ppm $FeSO_4+3\%\ H_2O_2$ at 70° C. for 3 h).

The oxidative stability for different fluorinated-aliphatic hydrocarbon based anion-exchange membranes was confirmed by recording percentage loss in membrane weight, ion-exchange capacity, and conductivity data after the treatment and included in Table 2.

TABLE 2

Oxidative stability of different anion-exchange membranes in terms of loss in membrane weight ($W_{loss}$), ion-exchange capacity ($IEC_{loss}$), and membrane conductivity ($\kappa_{loss}{}^m$) after oxidative treatment.

| Example | Weight ratio of IA-co-VI copolymer: PVDF-co-HFP (w/w)* | $W_{loss}$ (%) | $IEC_{loss}$ (meq/g) | $\kappa_{loss}{}^m$ ($\times 10^{-2}$ S cm$^{-1}$) |
|---|---|---|---|---|
| 4 | 2.0:0.5 | 1.6 | 2.4 | 4.1 |
| 5 | 2.0:1.0 | 2.4 | 2.6 | 4.3 |
| 6 | 2.0:1.5 | 2.7 | 2.9 | 4.9 |

Examples 7-9

General Procedure for Alkaline Stability of Anion-Exchange Membrane

The alkaline stability of different anion-exchange membranes was tested in 2.0 M NaOH solution at 60° C. for 5 days. The membrane alkaline stability was estimated in terms of percentage loss in membrane weight, ion-exchange capacity, and conductivity after alkaline treatment and relevant data are included in Table 3 for anion-exchange membranes.

TABLE 3

Alkaline stability of different anion-exchange membranes in terms of loss in membrane weight ($W_{loss}$), ion-exchange capacity ($IEC_{loss}$), and membrane conductivity ($\kappa_{loss}{}^m$) after alkaline treatment.

| Example | Weight ratio of IA-co-VI copolymer: PVDF-co-HFP (w/w)* | $W_{loss}$ (%) | $IEC_{loss}$ (meq/g) | $\kappa_{loss}{}^m$ ($\times 10^{-2}$ S cm$^{-1}$) |
|---|---|---|---|---|
| 7 | 2.0:0.5 | 2.9 | 3.6 | 3.8 |
| 8 | 2.0:1.0 | 3.5 | 3.9 | 4.4 |
| 9 | 2.0:1.5 | 3.9 | 4.3 | 4.9 |

Example 10

Desalination of Brackish Water Using Anion-Exchange Membrane by Electrodialysis Brackish water may or may not be chlorine dosed is provided as drinking water (total dissolved solid: <500 ppm) after desalination by electrodialysis. The brackish water may obtained either from earth surface or from ground, passed through chlorine-dosing or other treatment and to the electrodialysis desalination unit to remove excess of salt.

Figure 2:
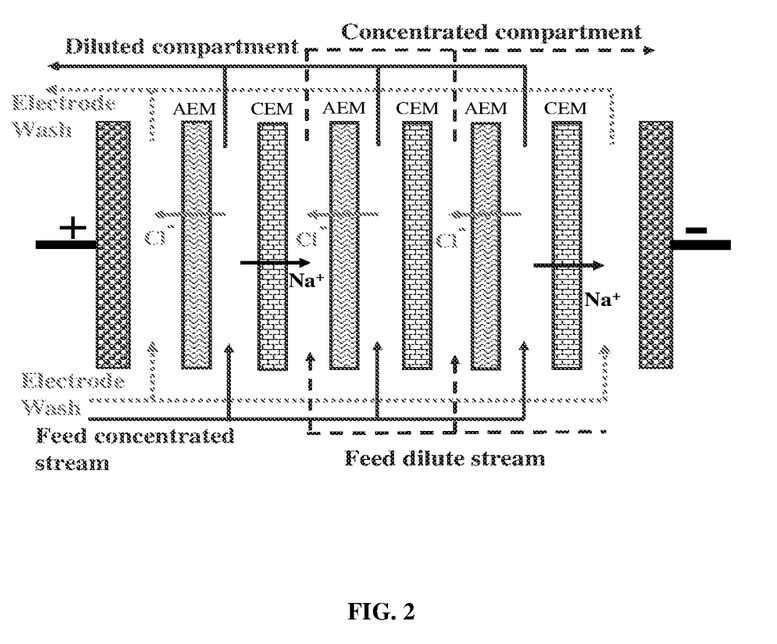
FIG. 2 depicts electrodialysis process using anion-exchange membrane for desalination of brackish water.

An electrodialysis (ED) unit containing 10 cell pairs of anion-exchange membrane (2.0:1.5; weight ratio of IA-co-VI copolymer) and cation-exchange membrane (CEM) (AMX supplied by Tokuyama Soda Co. Ltd., Japan); structure properties: poly(styrene)/divinyl benzene; ion-exchange capacity: 1.5 meq/g; water uptake: 26%, area resistance: 3.2 Ω cm$^2$) with 100 cm$^2$ effective membrane area was used desalination of brackish water. There was four compartments in ED unit, namely two electrodes wash (EW), concentrated stream (CS) and desalinated stream (DS) (FIG. 2). Precious metal oxides (titanium-ruthenium-platinum) coated $TiO_2$ sheets of 6.0 mm thickness, obtained from Titanium Tantalum Products (TITAN, Chennai, India) were used as electrodes fitted in the ED unit. Flow arrangement of each compartments was monitored by parallel-cum-series pattern. $Na_2SO_4$ solution (0.10 M) was recirculated in both interconnected EW compartments. Initially, brackish water (total dissolved solid (TDS): 2000-5000 ppm) was fed into DS (flow rate: 2.0 LPH) and CS ((flow rate: 0.6 LPH), both using peristaltic pumps. ED experiments were performed under influence of constant voltage (15.0 V) using a direct current power supply and resultant current was recoded. With progress of experiment TDS of DS was reduced to <500 ppm (drinking water as per World's Health Organization), while TDS of CS was significantly increased. The recovery of desalinated water was about 65%.

Example 11

Alkaline Fuel Cell Application Using Anion-Exchange Membrane by Electrodialysis Suitability of prepared anion-exchange membrane (2.0: 1.5; weight ratio of isopropylacrylamide-co-vinylimidazole (IA-co-VI) copolymer) for application in alkaline fuel cell was assessed. Membrane electrode assembly (MEA) was fabricated by following the technique where we consider three-layer structure, contains (anion-exchange membrane, anode/cathode catalyst layer and diffusion layers). Further the wet carbon coated with 10 wt % of IA-co-VI/PVDF-co-HFP copolymer solution by brush painting method was used. The gas diffusion layer (GDL) (25 cm²) geometric area) was fabricated by coating slurry of 0.50 mg/cm² consisting of carbon black (Vulcan XC72R) and IA-co-VI/PVDF-co-HFP copolymer dispersion on carbon paper. The Pt loading in both the anode and cathode was 0.4 mg/cm². Thus, the developed electrode was cold pressed membrane followed by curing at 60° C. for 12 h and then hot pressed at 130° C. for 3 min at 1.2 MPa. The MEA was achieved by hot pressing an electrode/membrane/electrode sandwich at a temperature of 100° C. for 3 min at 1.0 MPa. The MEA was assembled into a single cell (FC25-01 DM fuel cell), 1.0 M MeOH in 2 M NaOH was used as a fuel at anode and air at the cathode and fed with 5 ml min-1 and 100 ml min-1 respectively to record the current-voltage polarization curves with the help of an MTS-150 manual fuel cell test station (ElectroChem Inc., USA). The single cell performance was carried with developed anion-exchange membrane at 60° C. The prepared anion-exchange membrane (2.0:1.5; weight ratio of IA-co-VI copolymer) showed 150 mA/cm² of current density and 120 mW/cm² of power density at cell voltage of 0.79 V. This suggests the potential candidature of prepared anion-exchange membrane for fuel cell application.

Example 12

Cu—Cl Cycle for Membrane Electrolysis Using Anion-Exchange Membrane

Figure 3:
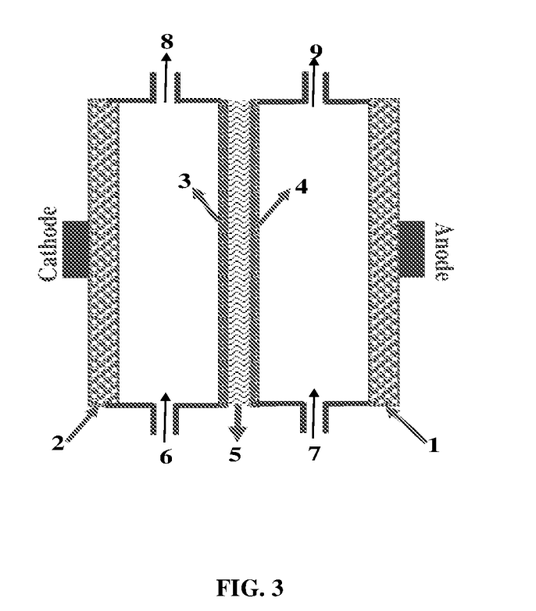
FIG. 3 depicts anion-exchange membrane electrolysis cell for the conversion of cuprous chloride in HCl and CuCl2, and hydrogen gas wherein 1 is anode, 2 is cathode, 3,4 are porous carbon paper; 5 is anion exchange membrane, 6 is hydrochloric acid solution, 7 is cuprous chloride solution in hydrochloric acid, 8 is cathode compartment outlet, 9 anode compartment outlet.

The Copper-Chlorine (Cu—Cl) cycle involving thermochemical water splitting is a promising method for large-scale hydrogen production using nuclear, solar or other thermal energy sources. It offers significant advantages over other thermochemical cycles such as relatively lower temperature operating requirements (below 550° C.) as compared to high temperature cycles that work at >750° C. and the ability to effectively utilize low-grade waste heat for endothermic processes. The performance of anion-exchange membrane (2.0:1.5; weight ratio of IA-co-VI copolymer) was evaluated in electrochemical cell, schematically presented in FIG. 3. The electrochemical cell with 800 ml capacity was designed and fabricated using platinum as anode as specified above (D=5.5 cm, surface area=33.17 cm²) and dense pure copper rod (D=0.7 cm, H=6.5 cm surface area=14.29 cm²) as cathode. The anion-exchange membrane was fixed in vertical position between two flanges. The anolyte and catholyte compartments made up of acrylic were separated using anion-exchange membrane. A Masterflex peristaltic pump, L/S 600 rpm Digital Drive with two pump heads of L/S Easy-Load 3 SS was used to circulate anolyte and catholyte.

The performance of anion-exchange membrane (2.0:1.5; weight ratio of IA-co-VI copolymer) assessed under optimized conditions: (1) equal surface area ratio of anode to cathode, (2) distance between electrodes: 3.5 cm, (3) concentration of HCl: 2.36 M, (4) concentration of CuCl: 0.30 M, (5) applied voltage: 0.70 V, (6) flow rate of electrolyte: 125 ml/min for catholyte, 250 ml/min for anolyte, (7) reaction time: 5 h, (8) reaction temperature: 30° C. The experiments were repeated thrice. The data included in Table 4 represents the performance of anion-exchange membrane (2.0:1.5; weight ratio of IA-co-VI copolymer) for Cu—Cl cycle (membrane electrolysis) for hydrogen production.

TABLE 4

Performance of anion-exchange membrane (2.0:1.5; weight ratio of IA-co-VI copolymer) for Cu-Cl cycle (membrane electrolysis) for hydrogen production

| Example 12 | Applied Voltage (Volt) | Avg. Current obtained (Amp) | Avg. current from three experiments (Amp) | Avg. Cathodic current density (mAmp/cm²) |
|---|---|---|---|---|
| Example 12 | 0.7 | 0.48 | 0.45 | 57 |

Advantages of the Invention

Advantages of the present invention are:
1. Homogenous anion exchange membrane with fluorinated polymer backbone, responsible for high membrane stability under strong oxidative, acidic and alkaline environment.
2. Plenty of quaternary ammonium groups in the membrane structure, are responsible for good IEC and membrane conductivity.
3. Highly stable and efficient anion exchange membrane for different electro-membrane processes such as water desalination, electro-separation, membrane electrolysis, alkaline fuel cell, and storage battery etc.
4. Cost-effective anion exchange membrane with high permeselectivity, high conductivity.
5. Anion-exchange membrane may be widely used for, electro-deionization, electrodialysis for the removal of inorganic electrolyte, desalination of sea and brackish water, separation and removal of metal ions from the industrial effluent, de-acidification of fruit juice, dashing and sugar cane juice even at high temperature (70-80° C.) for better quality of sugar, purifications and amino acids, vitamins, vaccines and other biochemical purification and down-stream processing of fermentation broth, etc. can be achieved by stable anion-exchange membranes.

We claim:
1. An anion-exchange membrane having repeating unit of Formula 1,

Formula 1 wherein m and n are integers.

2. The anion-exchange membrane of claim 1, wherein the membrane has an ion-exchange capacity in the range of 1.00 to 1.70 meq/g.

3. The anion-exchange membrane of claim 1, wherein the membrane has conductivity in the range of $3.0 \times 10^{-2}$ to $6.0 \times 10^{-2}$ S cm$^{-1}$.

4. The anion-exchange membrane of claim 1, wherein the membrane exhibits a swelling ratio in the range of 5-10% under treatment of water at a temperature in the range of 60-65° C. for a time period in the range of 24-36 hours.

5. The anion-exchange membrane of claim 1, wherein a membrane weight, an ion-exchange capacity and a conductivity loss is less than 4% under an alkaline environment or under a harassed oxidative environment.

6. The anion-exchange membrane of claim 5, wherein the alkaline environment is achieved by 2.0 M NaOH at a temperature in the range of 60-65° C. for a time period in the range of 120-150 hours; and the harassed oxidative environment is achieved by 3 ppm+3% H$_2$O$_2$ at temperature of 70° C. for 1-3 hours.

7. A process for the preparation of the anion-exchange membrane of claim 1, comprising the steps of:
i. adding 1-vinylimidazole and N-isopropylacrylamide to dimethyl acetamide in a vessel under constant stirring and nitrogen environment at temperature in the range of 25 to 30° C. to obtain a solution;
ii. charging the solution obtained in step (i) with radical initiator azobisisobutyronitrile (AIBN) at temperature in the range of 90-95° C. for period in the range of 24 hours with stirring to obtain an isopropylacrylamide-co-vinylimidazole (IA-co-VI) copolymer solution;
iii. mixing a poly(vinylidene fluoride-co-hexafluoropropylene) [PVDF-co-HFP] copolymer and dimethyl acetamide (DMAc) in a ratio of 1:5 (w/v) for time period in the range of 14 hours to obtain a solution;
iv. mixing the solutions obtained in steps (ii) and (iii) with stirring at a temperature in the range of 75-95° C. for a time period of 12 hours to obtain a membrane forming polymer solution;
v. casting a thin film membrane with the membrane forming polymer solution obtained in step (iv), followed by drying at a temperature in the range of 60-80° C. for a time period in the range of 24-30 hours under vacuum to obtain a membrane;
vi. quaternizing the thin film membrane obtained in step (v) by dipping the thin film membrane in a 10 wt % methyl iodide solution for a time period in the range of 24-30 hours at a temperature in the range of 30-40° C. to introduce a quaternary ammonium group in a matrix of the thin film membrane to form a quaternized thin film membrane; and
vii. washing the quaternized thin film membrane obtained in step (vi) followed by immersing the quaternized thin film membrane in a sodium hydroxide solution to obtain the anion-exchange membrane.

8. The process of claim 7, wherein in the step (i), the N-isopropylacrylamide and the 1-vinylimidazole are added in a weight ration ranging from 2:0.5 to 2:1.5.

9. The process of claim 7, wherein in step (iv), the dimethyl acetamide and the isopropylacrylamide-co-vinylimidazole copolymer in the ratio of 1:10 (w/v).

10. The process of claim 7, wherein in step (iv), the ratio of isopropylacrylamide-co-vinylimidazole (IA-co-VI) copolymer and PVDF-co-HFP copolymer is in the range of 1.0-1.5:0.5-0.7 (w/w).

11. The anion-exchange membrane of claim 1, wherein the structure of Formula 1 is formed by
preparing an isopropylacrylamide-co-vinylimidazole copolymer from N-isopropylacrylamide and 1-vinylimidazole in a weight ratio ranging from 2:0.5 to 2:1.5; and
reacting vinylimidazole groups of the isopropylacrylamide-co-vinylimidazole copolymer with methyl iodide to form vinyl-3-methylimidazolium groups.

12. An anion-exchange membrane comprising:
an isopropylacrylamide-co-vinyl-3-methylimidazolium copolymer; and
a poly (vinylidene fluoride-co-hexafluoropropylene) copolymer,
wherein the isopropylacrylamide-co-vinyl-3-methylimidazolium copolymer and the poly(vinylidene fluoride-co-hexafluoropropylene) copolymer are bound together by hydrogen bonding interactions.

13. The anion-exchange membrane of claim 12, wherein the membrane has an ion-exchange capacity in the range of 1.00 to 1.70 meq/g.

14. The anion-exchange membrane of claim 12, wherein the membrane has conductivity in the range of $3.0 \times 10^{-2}$ to $6.0 \times 10^{-2}$ S cm$^{-1}$.

15. The anion-exchange membrane of claim 12, wherein the membrane exhibits a swelling ratio in the range of 5-10% under treatment of water at a temperature in the range of 60-65° C. for a time period in the range of 24-36 hours.

16. The anion-exchange membrane of claim 12, wherein a membrane weight, an ion-exchange capacity and a conductivity loss is less than 4% under an alkaline environment or under a harassed oxidative environment.

17. The anion-exchange membrane of claim 16, wherein the alkaline environment is achieved by 2.0 M NaOH at a temperature in the range of 60-65° C. for a time period in the range of 120-150 hours; and the harassed oxidative environment is achieved by 3 ppm+3% H$_2$O$_2$ at temperature of 70° C. for 1-3 hours.

* * * * *